US011463901B2

(12) United States Patent
Wang et al.

(10) Patent No.: US 11,463,901 B2
(45) Date of Patent: Oct. 4, 2022

(54) APPARATUSES AND METHODS TO FACILITATE LOAD-AWARE RADIO ACCESS NETWORK RESOURCE ALLOCATIONS

(71) Applicant: AT&T Intellectual Property I, L.P., Atlanta, GA (US)

(72) Inventors: Huahui Wang, Bridgewater, NJ (US); Gopalakrishnan Meempat, East Brunswick, NJ (US); Ravi Raina, Skillman, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 267 days.

(21) Appl. No.: 16/868,599

(22) Filed: May 7, 2020

(65) Prior Publication Data

US 2021/0352517 A1 Nov. 11, 2021

(51) Int. Cl.
*H04W 28/02* (2009.01)
*H04B 7/0413* (2017.01)
*H04B 17/318* (2015.01)
*H04W 16/28* (2009.01)
*H04W 72/04* (2009.01)

(52) U.S. Cl.
CPC ...... *H04W 28/0236* (2013.01); *H04B 7/0413* (2013.01); *H04B 17/318* (2015.01); *H04W 16/28* (2013.01); *H04W 72/0486* (2013.01)

(58) Field of Classification Search
CPC ............ H04W 28/0236; H04W 16/28; H04W 72/0486; H04W 24/02; H04B 7/0413; H04B 17/318
See application file for complete search history.

(56) References Cited

U.S. PATENT DOCUMENTS

| 8,761,102 | B2 | 6/2014 | Puthenpura et al. |
| 9,392,471 | B1* | 7/2016 | Thomas ................. H04L 43/16 |
| 11,012,873 | B1* | 5/2021 | Mondragon .......... H04W 16/18 |
| 2009/0163223 | A1 | 6/2009 | Casey |
| 2010/0103820 | A1* | 4/2010 | Fuller .................. H04W 48/06 370/236 |
| 2012/0224481 | A1 | 9/2012 | Babiarz et al. |
| 2013/0242777 | A1 | 9/2013 | Cai et al. |

(Continued)

OTHER PUBLICATIONS

Fayolle, G. et al., "Sharing a Processor Among Many Job Classes", https://www.researchgate.net/publication/234829395, Jul. 1, 1980, 15 pgs.

(Continued)

*Primary Examiner* — Hassan Kizou
*Assistant Examiner* — Abdullahi Ahmed
(74) *Attorney, Agent, or Firm* — Guntin & Gust, PLC; Robert Gingher

(57) ABSTRACT

Aspects of the subject disclosure may include, for example, calculating a respective first quality metric for each cell of a plurality of cells included in a network, calculating a respective second quality metric for each cell of the plurality of cells, calculating a capacity of each cell of the plurality of cells in accordance with the first quality metric for the cell and the second quality metric for the cell, and allocating traffic of the network amongst the plurality of cells in accordance with the respective capacity of each cell of the plurality of cells. Other embodiments are disclosed.

20 Claims, 11 Drawing Sheets

(56) References Cited

U.S. PATENT DOCUMENTS

| | | | |
|---|---|---|---|
| 2014/0031006 A1* | 1/2014 | Moore | H04W 24/02 455/405 |
| 2014/0092731 A1* | 4/2014 | Gupta | H04W 24/10 370/229 |
| 2014/0355463 A1* | 12/2014 | Smith | H04W 36/32 370/252 |
| 2016/0119816 A1 | 4/2016 | Yasukawa et al. | |
| 2017/0367081 A1 | 12/2017 | Cui | |
| 2018/0070245 A1 | 3/2018 | Liao et al. | |
| 2018/0368037 A1 | 12/2018 | Wang et al. | |
| 2019/0075055 A1 | 3/2019 | Esserman et al. | |
| 2019/0335340 A1 | 10/2019 | Scanferla et al. | |
| 2019/0335342 A1 | 10/2019 | Jacinto et al. | |
| 2020/0260344 A1* | 8/2020 | Yanover | H04L 41/0893 |
| 2021/0258800 A1 | 8/2021 | Yang et al. | |
| 2021/0352493 A1 | 11/2021 | Meempat et al. | |
| 2021/0352530 A1 | 11/2021 | Meempat et al. | |
| 2021/0368384 A1* | 11/2021 | Bhaskar | H04B 7/0854 |
| 2022/0086664 A1 | 3/2022 | Meempat et al. | |

OTHER PUBLICATIONS

Shepherd, Paul, "Learn about QoS in 5GG Networks by Paul Shedpherd", Learn about QoS in 5GG Networks by Paul Shedpherd (https://www.awardsolutions.com), http://www.awardsolutions.com/, Jan. 1, 2020, 5 pgs.

* cited by examiner

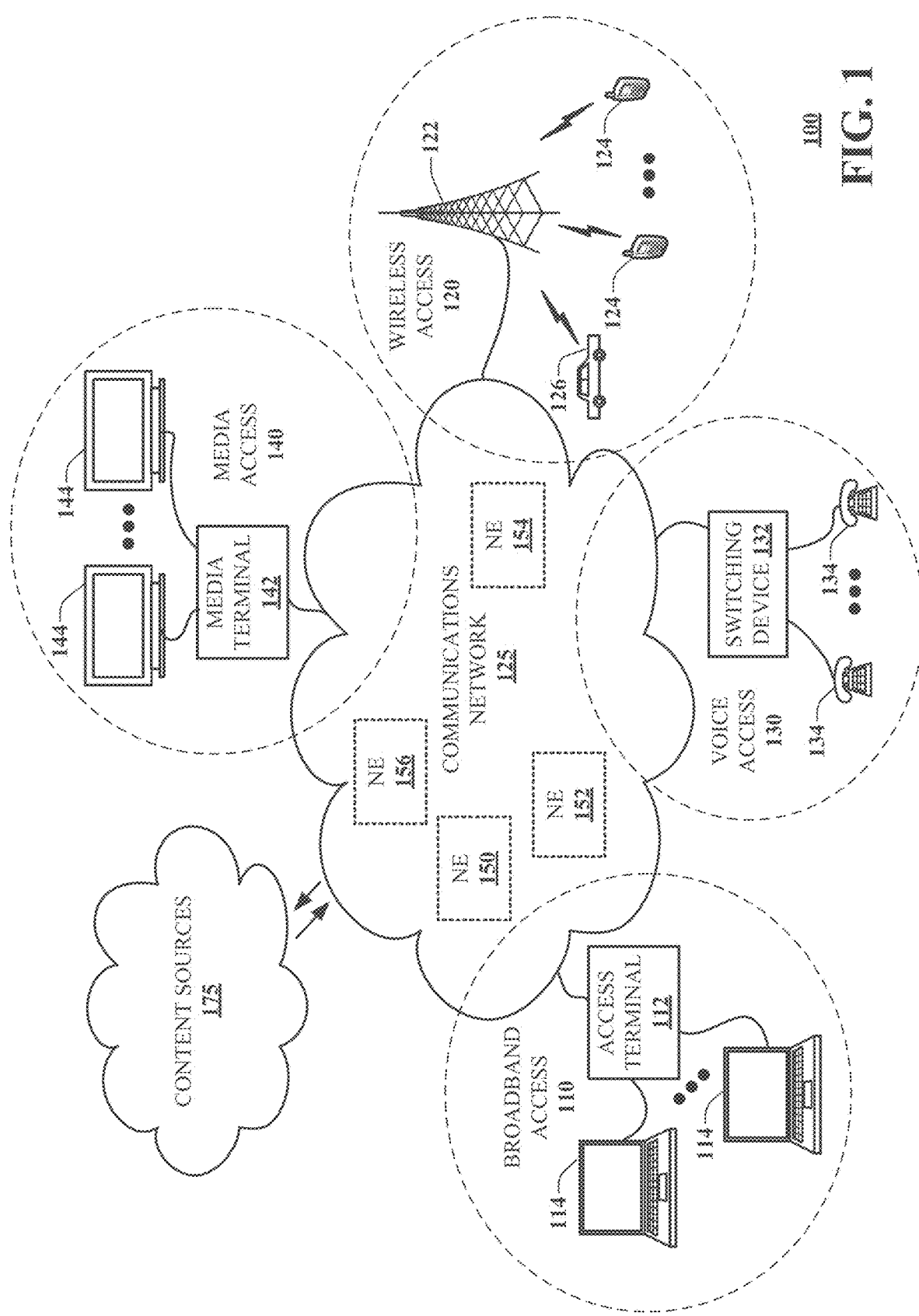

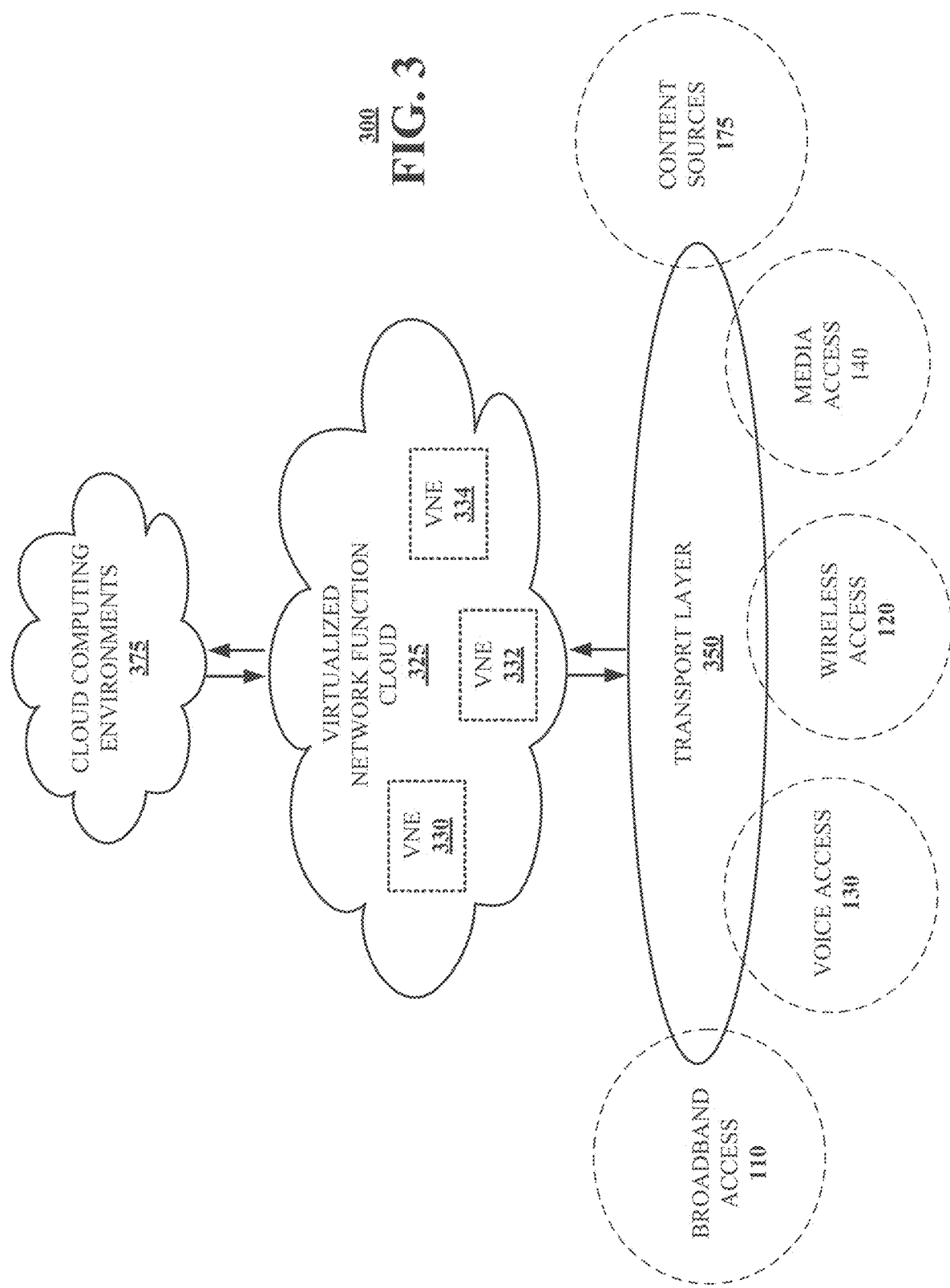

APPARATUSES AND METHODS TO FACILITATE LOAD-AWARE RADIO ACCESS NETWORK RESOURCE ALLOCATIONS

FIELD OF THE DISCLOSURE

The subject disclosure relates to apparatuses and methods to facilitate load-aware radio access network resource allocations.

BACKGROUND

As the world becomes increasingly connected via vast communication networks and communication devices, additional challenges are created/generated from the perspective of provisioning and managing network resources. For example, from a perspective of a network operator, a policy that favors cost reduction (e.g., cost minimization) while deemphasizing (e.g., disregarding/ignoring) quality of service (QoS) parameters runs a risk of degradation in terms of a user's quality of experience (QoE). The reduction in QoE may tend to alienate/annoy the user, potentially to the point that the user may terminate service with the network operator. On the other hand, a policy that conservatively allocates resources (e.g., spectrum, bandwidth, etc.) to ensure high levels of QoS or QoE, without taking into account fine-grain QoS considerations, runs a risk of wasteful/unnecessary surplus investment.

In an effort to manage resource allocations/deployments, historical network key performance indicators (KPIs) may be monitored and analyzed. However, resource demands/loads tend to be dynamic in nature, such that the use of KPIs alone fails to provide needed accuracy/resolution. Additional complexity in the analysis is a result of interference (amongst other factors) that impacts an actual capacity (as opposed to a theoretical capacity) that is available in a network or a portion thereof (e.g., a cell or sector of the network). Interference, which is based on traffic demands, network topologies, radio propagation factors, etc., tends to be dynamic in nature, representing yet another layer/factor of complexity in the analysis.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
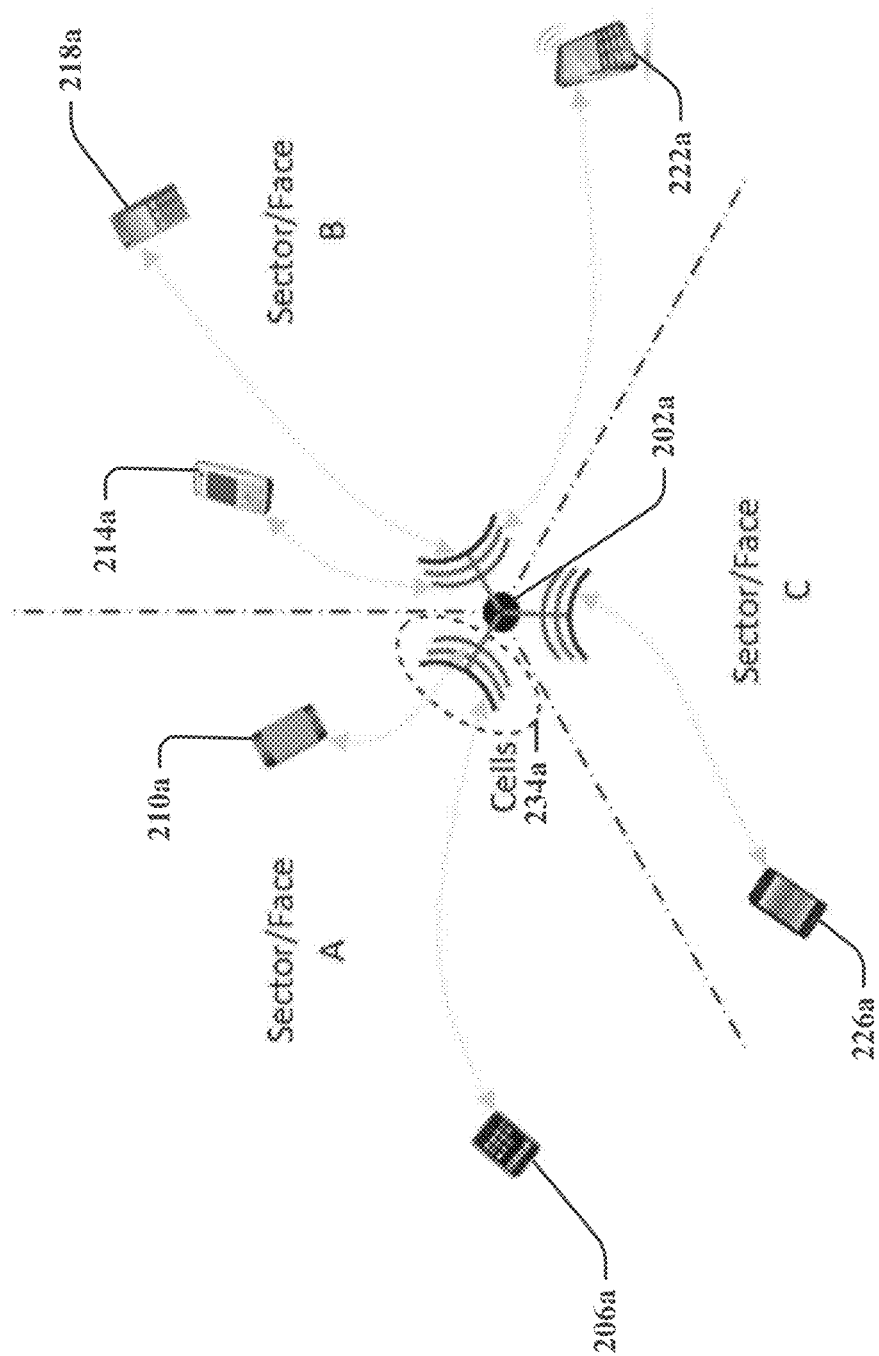
FIG. 2A is a block diagram illustrating an example, non-limiting embodiment of a system functioning within the communication network of FIG. 1 in accordance with various aspects described herein.

The subject disclosure describes, among other things, illustrative embodiments for allocating/dimensioning resources in a network or system and/or distributing traffic/demand/load amongst the resources. Other embodiments are described in the subject disclosure.

One or more aspects of the subject disclosure include obtaining a first forecast of a first load for a sector of a network, calculating a respective first signal to interference plus noise ratio for each cell of a plurality of cells included in the sector, calculating a respective second signal to interference plus noise ratio for each cell of the plurality of cells, determining a capacity of each cell of the plurality of cells in accordance with the first signal to interference plus noise ratio of the cell and the second signal to interference plus noise ratio of the cell, and distributing the first load amongst the plurality of cells in accordance with the respective capacity of each cell of the plurality of cells.

One or more aspects of the subject disclosure include calculating a respective first quality metric for each cell of a plurality of cells included in a network, calculating a respective second quality metric for each cell of the plurality of cells, determining a capacity of each cell of the plurality of cells in accordance with the first quality metric for the cell and the second quality metric for the cell, and allocating traffic of the network amongst the plurality of cells in accordance with the respective capacity of each cell of the plurality of cells.

One or more aspects of the subject disclosure include identifying a forecasted demand within a network over a first time period, wherein the network includes a plurality of cells, predicting an availability of resources in the network over the first time period, determining that the forecasted demand within the first time period exceeds the availability of resources in the network over the first time period relative to a threshold, and responsive to the determining, causing an upgrade of a capacity of the network, wherein the upgrade of the capacity comprises one or both of: deploying a new cell in the network, wherein the new cell is not included in the plurality of cells, and increasing a wireless spectrum allocation of a first cell of the plurality of cells Referring now to FIG. 1, a block diagram is shown illustrating an example, non-limiting embodiment of a system 100 in accordance with various aspects described herein. For example, system 100 can facilitate in whole or in part calculating a respective second signal to interference plus noise ratio for each cell of the plurality of cells, calculating a capacity of each cell of the plurality of cells in accordance with the first signal to interference plus noise ratio of the cell and the second signal to interference plus noise ratio of the cell, and distributing the first load amongst the plurality of cells in accordance with the respective capacity of each cell of the plurality of cells. System 100 can facilitate in whole or in part calculating a respective first quality metric for each cell of a plurality of cells included in a network, calculating a respective second quality metric for each cell of the plurality of cells, calculating a capacity of each cell of the plurality of cells in accordance with the first quality metric for the cell and the second quality metric for the cell, and allocating traffic of the network amongst the plurality of cells in accordance with the respective capacity of each cell of the plurality of cells. System 100 can facilitate in whole or in part identifying a forecasted demand within a network over a first time period, wherein the network includes a plurality of cells, predicting an availability of resources in the network over the first time period, determining that the forecasted demand within the first time period exceeds the availability of resources in the network over the first time period relative to a threshold, and responsive to the determining, causing an upgrade of a capacity of the network, wherein the upgrade of the capacity comprises one or both of: deploying a new cell in the network, wherein the new cell is not included in the plurality of cells, and increasing a wireless spectrum allocation of a first cell of the plurality of cells.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200a functioning within, or operatively overlaid upon, the communication network 100 of FIG. 1 in accordance with various aspects described herein. In particular, the system 200a may include a tower/base station 202a that may be used to provide service to one or more communication devices, e.g., communication devices 206a, 210a, 214a, 218a, 222a, and 226a. The tower 202a may be communicatively linked/coupled to backhaul infrastructure (not shown in FIG. 2A) via wired and/or wireless connections.

The coverage provided by the tower 202a may be divided into multiple sectors/faces, such as for example three sectors/faces denoted as sector/face A, second/face B, and sector/face C in FIG. 2A. Each of the sectors/faces may be further divided into multiple cells, e.g., cell 234a in FIG. 2A. Each cell within a sector/face may operate at a distinct carrier frequency. The use of multiple carrier frequencies within a sector/face may enhance a data carrying capacity, which in turn may enhance a quality of experience (QoE) or quality of service (QoS).

In the instance of the exemplary system 200a shown in FIG. 2A, the communication devices 206a and 210a may obtain service via the sector/face A, the communication devices 214a-222a may obtain service via the sector/face B, and the communication device 226a may obtain service via the sector/face C. However, one or more of the communication devices 206a-226a may be a mobile device and may migrate from a scope of coverage associated with a first sector/face (e.g., sector/face A) to a scope of coverage associated with a second sector/face (e.g., sector/face B). In this regard, the tower 202a may facilitate a handover of service (e.g., a handover of a communication session) from the first sector/face to the second sector/face. Still further, in some embodiments a handover of service may be provided from the tower 202a to another tower (not shown in FIG. 2A) if a communication device leaves the range of coverage provided by any of the sectors/faces associated with the tower 202a.

Figure 2B:
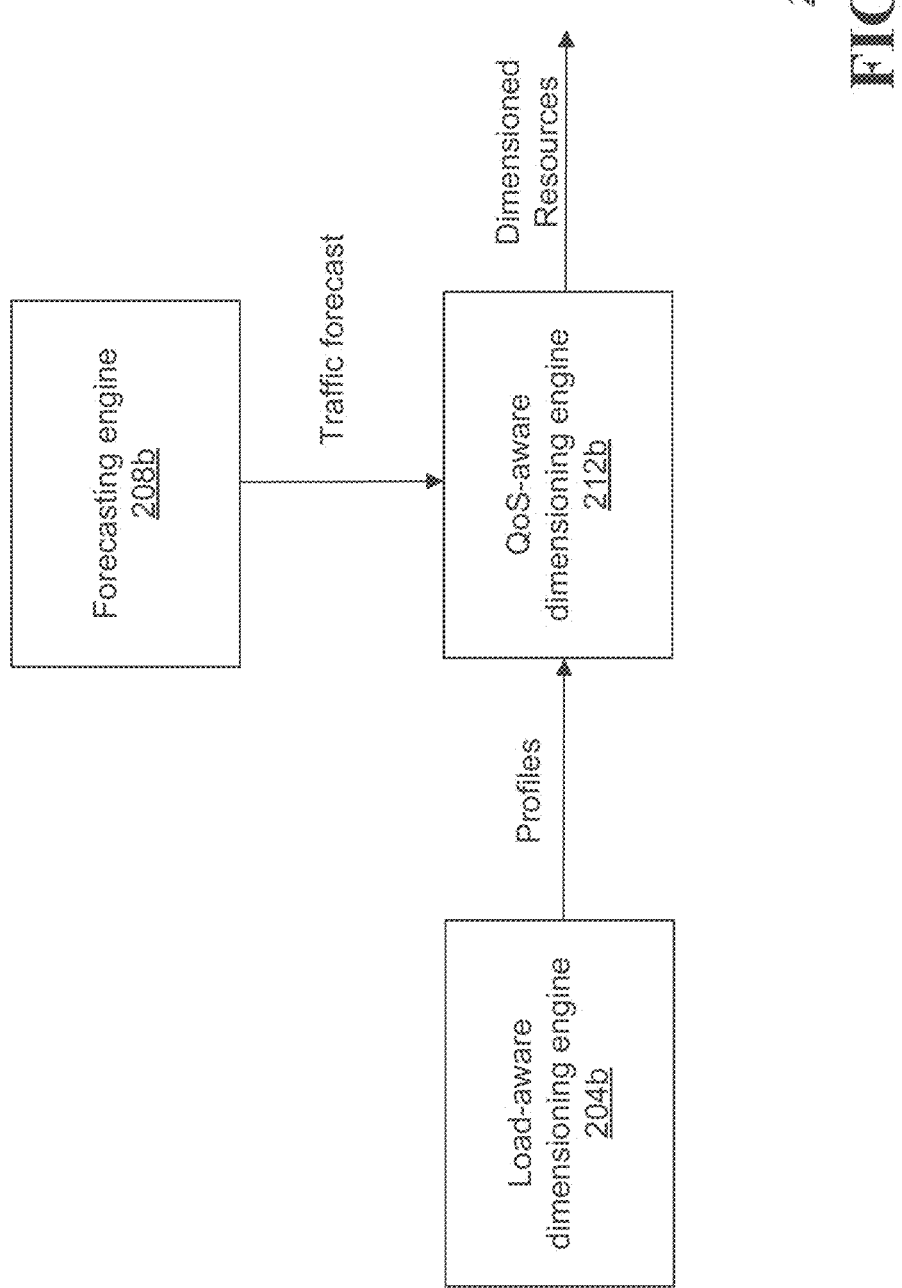
FIG. 2B is a block diagram illustrating an example, non-limiting embodiment of a system functioning within the system of FIG. 2A in accordance with various aspects described herein.

Aspects of the system 200a may be implemented in conjunction with an allocation of resources. To demonstrate, and referring to FIG. 2B, a system 200b is shown that may be used to dimension/allocate resources (e.g., radio resources, communication bandwidth, control resources, etc.) associated with a communication network or system, such as the system 200a of FIG. 2A. The system 200b may include a load-aware dimensioning engine 204b, a forecasting engine 208b, and a QoS-aware dimensioning engine 212b.

The load-aware dimensioning engine 204b may generate profiles for, e.g., each cell of the network or system. The profiles, which may include or be based on various parameters (e.g., signals, interference, noise, etc.), may be specified in an uplink direction, a downlink direction, or both uplink and downlink directions. In some embodiments, one or more of the parameters may be combined in connection with a given profile. For example, in some embodiments the load-aware dimensioning engine 204b may generate a signal-to-interference-plus-noise (SINR) profile for a given cell. The SINR profile for a given communication device may be based at least in part on estimates/projections of the communication device being located within the cell, estimates/projections of a communication session of the communication device falling within a given SINR class/category, and estimates/projections and/or measurements of throughput within the given SINR class/category.

The forecasting engine 208b may generate forecasts of traffic in the network or system. The forecasts may be based on traffic projections at a given level of granularity. In some embodiments, the generation of the forecasts may take into considerations of a type of traffic (e.g., voice and video), and elasticity in terms of data volume at different priority levels/classes.

The QoS-aware dimensioning engine 212b may be operative on the outputs of the load-aware dimensioning engine 204b (e.g., the SINR profile) and the forecasting engine 208b to provide/generate dimensioned resource allocations based on further QoS requirements, such as average user throughput per traffic class, etc. The dimensioned resource allocations may include, e.g., radio spectrum, communication bandwidth, capacity, transmission power, processing resources, modulation schemes, etc., or any combination thereof.

In accordance with aspects of this disclosure (e.g., in accordance with aspects of the system 200b), an area (e.g., a geographical area or region) where cells may be deployed and/or have been deployed may be divided up/segmented into bins. Each of the bins may be associated with a respect index b. With a total of M bins, the indices may range from b=1 to b=M.

At a given sector/face, there may be a total of $\Psi$ potential carriers/cells. Each of the carriers/cells may be referenced by an index j, from j=1 to j=$\Psi$. Moreover, each of the carriers/cells j may have up to K bandwidth subscription options/levels and may be referenced by an index i, from i=1 to i=K. When carrier j is deployed at subscription level i, the number of physical resource blocks (PRBs) available from the carrier may be denoted as $B_{j,i}$.

In this example, it may be assumed that in a particular sector/face and dimensioning epoch (e.g., a month) that y cells/carriers are already deployed per dimensioning exercises conducted in the past, where y≤$\Psi$. Additionally, it may be assumed that for each of the carriers j=1 to j=y−1 that the carrier is already at its maximum subscription level (i=K), and thus has the maximal number $B_{j,K}$ resource blocks deployed. The final carrier (j=$\Psi$) may be at any of its possible subscription levels (e.g., any of i=1 to i=K), and thus, may have a resource block allocation of $B_{\Psi,i}$.

Figure 2C:
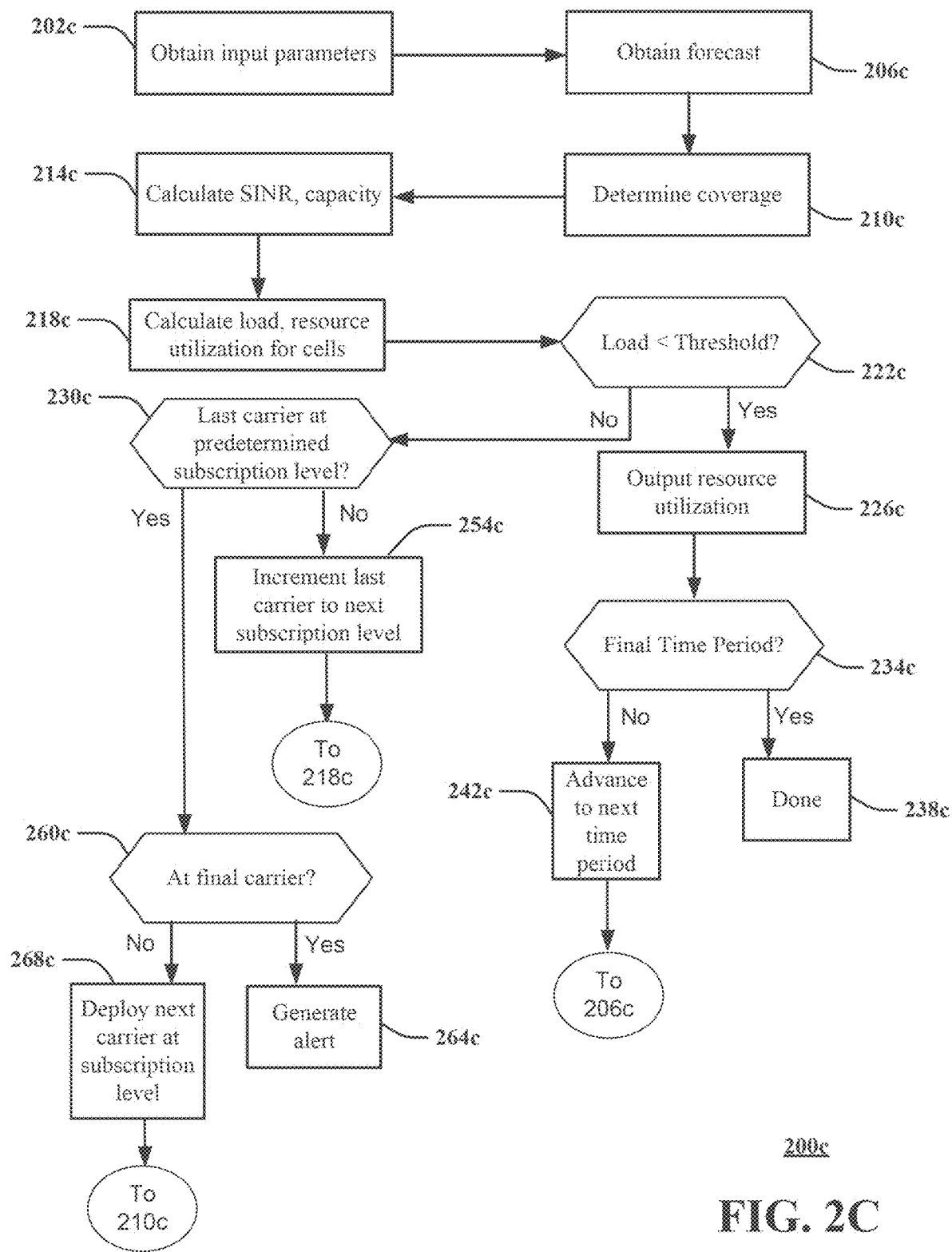
FIG. 2C depicts an illustrative embodiment of a method in accordance with various aspects described herein.

With the foregoing assumptions in place, FIG. 2C depicts an illustrative embodiment of a method 200c in accordance with various aspects described herein. In particular, the method 200c may be executed to identify/determine a dimensioning of resources in a given sector/face, starting from a current deployment (y, i). The method 200c may be partially or wholly executed by one or more systems, devices, and/or components, such as for example the systems, devices, and components set forth herein. As set forth above and below, the method 200c may be executed in accordance with a passage of time (e.g., the start of a new epoch or planning for subsequent time periods). In some embodiments, the method 200c may be executed in response to an occurrence of one or more events or conditions, such as for example users enrolling in a service of a network operator/provider associated with some, or all, of the method 200c.

In block 202c, one or more input parameters may be obtained. For example, information regarding cells associated with the sector/face may be obtained, potentially as part of a market or spectrum landscaping activity/task. Information regarding infrastructure (e.g., power configurations/power levels, number or availability of transmitters and/or receivers, number or availability of antennas, etc.) may be obtained as part of block 202c. Information regarding propagation models (e.g., how power fades over time or distance) may be obtained as part of block 202c. Block 202c may include obtaining information regarding a distribution of communication devices (e.g., user equipment) within the sector/face—e.g., information may be obtained regarding a position of the communication devices relative to one or more cell perimeters/edges. Block 202c may include obtaining information regarding capacity, resource utilization, and other statistics of the real deployment as the initial state of the cells. These states could change when the traffic forecast and network deployment change later on.

As part of block 202c, a variable directed to the epoch may be initialized to a first time period within the epoch. For example, if the method 200c is being executed as part of planning/provisioning/allocating resources for a given year, the year may be divided into discrete months, resulting in a potential value for the variable from 1 to 12 (where each increment in value corresponds to a given month in the year). Of course, the method 200c may be implemented over epochs that are different from a year. For example, the epoch/time periods may be broken down, e.g., quarterly, over a period of a few weeks, etc.

In block 206c, a forecast of traffic load/demand may be obtained for the given time period in the epoch as represented by the variable discussed above. For example, the forecast of traffic load/demand may be based at least in part on logs/records of demand for previous time periods, service agreements/contracts entered into by users, users declining to renew service at the expiration of their respective agreements/contracts (or failing to pay subscription/service fees), etc. The forecast of traffic load/demand may be specified in one or more terms, such as for example a busy hour (BH) forecast corresponding to expected peak traffic demands/loads.

In block 210c, a determination may be made regarding coverage provided by the sector/face. For example, block 210c may be executed once for each cell included in the sector/face, in terms of a downlink direction and/or an uplink direction. Specific examples of determining the coverage as part of block 210c are set forth in further detail below. The determination of the coverage in block 210c may be based in part on the information obtained as part of block 202c.

In block 214c, a signal to interference plus noise ratio (SINR) and/or a capacity may be calculated. For example, as part of block 214c, SINR profiles/values for communication devices located within the sector/face may be computed/determined. The SINR profiles/values may map to throughput values, which in turn may map to capacities for the cells in the sector/face. Specific examples of determining the SINR values and capacities as part of block 214c are set forth in further detail below.

In block 218c, the load for the sector/face and resource utilizations for each cell may be computed/determined. The computations/determinations of block 218c may be based on the outputs/results of the execution of block 214c. A more detailed description of the operations of block 218c is set forth below In block 222c, a determination may be made regarding whether the load (computed in block 218c) is less than a threshold. A value of the threshold may be selected based on an identification/prediction of one or more applications (to be) executed by the communication devices in the sector/face, one or more QoS or QoE requirements, etc. In some embodiments, the threshold may be dynamic in nature. For example, different values for the threshold of block 222c may be used for different time periods within a given epoch.

If the determination of block 222c is answered in the affirmative, flow may proceed from block 222c to block 226c. Otherwise, flow may proceed from block 222c to block 230c.

In block 226c, one or more outputs regarding resource utilization may be provided. For example, the outputs of block 226c may include spectrum and/or PRB utilization. The outputs of block 226c may be included as part of one or more presentations, reports, etc. The resource utilization from block 226c will be used in the next time period, if the final time period is not reached, to calculate this cell's interference to its neighbors such that neighboring cells' SINR values can be calculated in 214c.

In block 234c, a determination may be made whether the variable directed to the time period (see the discussion above in connection with block 202c) has reached the terminal/final time period within the epoch. If so, then flow may proceed from block 234c to block 238c, denoting that the method 200c is done/complete for the epoch. Otherwise, flow may proceed from block 234c to block 242c.

In block 242c, the variable directed to the time period may be incremented to the next time period. From block 242c, flow may proceed to block 206c.

In block 230c, a determination may be made whether the last-allocated carrier/cell y is at a predetermined subscription level (e.g., a maximum subscription level). If not, flow may proceed from block 230c to block 254c. Otherwise, flow may proceed from block 230c to block 260c.

In block 254c, the last-allocated carrier/cell y may be incremented from a current subscription level to a next subscription level. The next subscription level may be less than or equal to the predetermined (e.g., maximum) subscription level of block 230c. The next subscription level may include an increment in terms of wireless spectrum allocated to the last-allocated carrier/cell y. From block 254c, flow may proceed to, e.g., block 218c as part of a loop to check/verify whether the incrementation of block 254c is sufficient to satisfy the demand/load.

In block 260c, a determination may be made whether all of the potential carriers/cells are already deployed in the sector/face (e.g., the determination of block 260c may correspond to a determination of whether y=Ψ). If so, flow may proceed from block 260c to block 264c. Otherwise, flow may proceed from block 260c to block 268c.

In block 264c, an alert/warning, or other indication, may be generated. The alert/warning/indication may advise that the sector/face lacks resources (e.g., spectrum) in an amount that is sufficient to meet the demand/load (at least within the threshold/tolerance of block 222c). In response to that alert/warning/indication, one or more actions may be taken, such as for example provisioning a new sector/face.

In block 268c, the next cell/carrier may be deployed. For example, the new cell may be referenced as y+1, where y+1≤Ψ. The new cell y+1 may be allocated/deployed with a subscription level corresponding to a discrete/predetermined subscription level. For example, the new cell y+1 may be allocated a minimum subscription level (e.g., i=1). From block 268c, flow may proceed to block 210c.

Figure 2D:
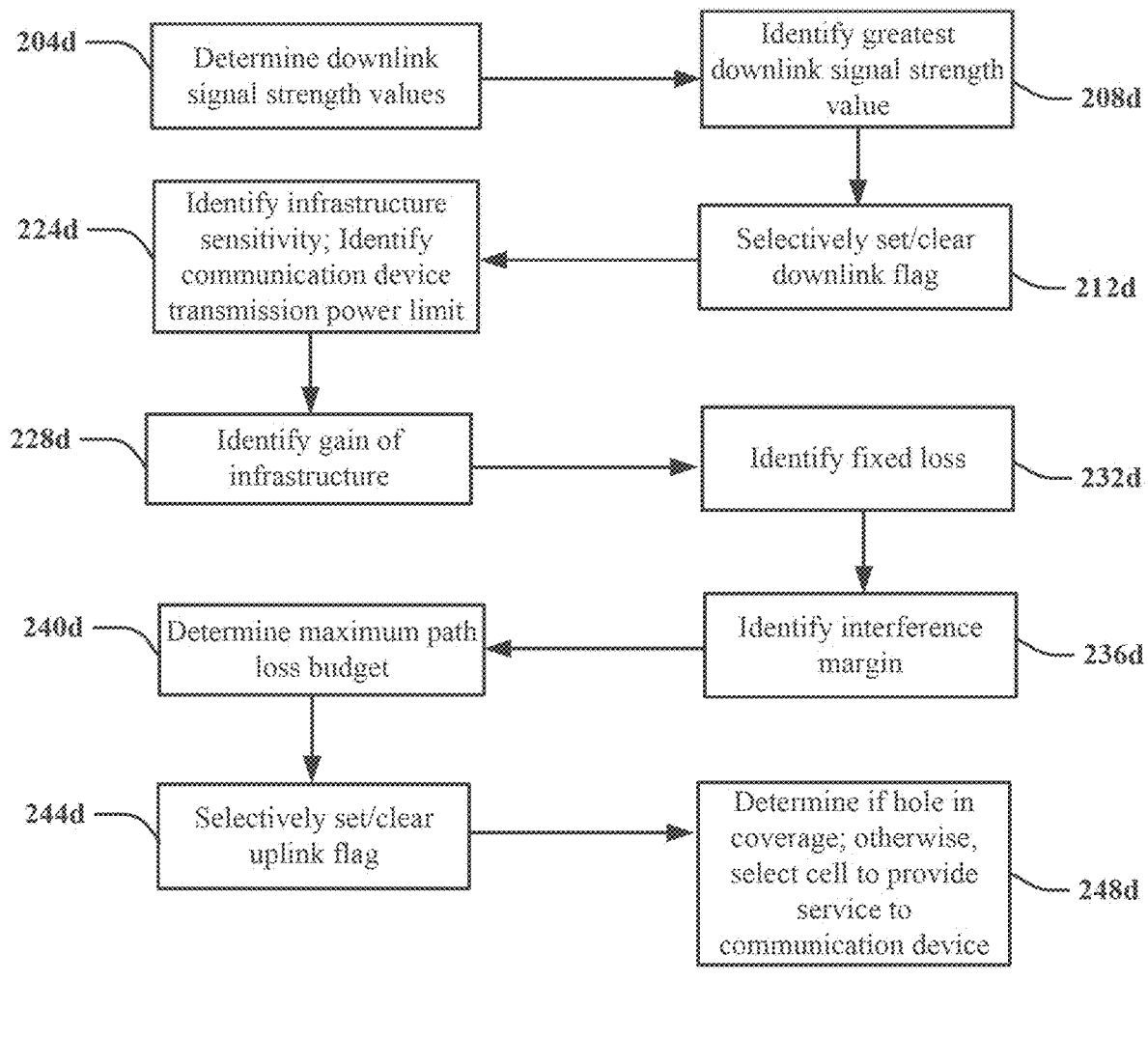
FIG. 2D depicts an illustrative embodiment of a method for determining a coverage of a sector of a network in accordance with aspects set forth herein.

Referring now to FIG. 2D, an illustrative embodiment of a method 200d is shown. In some embodiments, the method 200d may be executed in conjunction with one or more of the blocks/operations of the method 200c of FIG. 2C. For example, the method 200d may be executed as part of the determination of coverage in respect of block 210c of FIG. 2C.

In block 204d, for each bin (e.g., bins b=1 through b=M as set forth above) a determination/calculation of a signal strength from all cells in the bin in a downlink direction may be obtained. For example, the signal strength may be specified in accordance with, or may be based on, a reference signal transmitted by infrastructure (e.g., a base station or a tower) of a given cell, resulting in a reference signal receive power (RSRP) parameter for the cell for a given bin. In some embodiments, multiple instances of the reference signal may be provided, and one or more filtering (e.g., averaging) schemes may be used to reduce the impact of spurious results/signals.

In block 208d, for each bin the cell with the greatest signal strength (e.g., the largest RSRP value) of block 204d may be identified/selected.

In block 212d, for each bin a respective downlink Boolean flag may be selectively set or cleared. For example, a downlink Boolean flag may be set in block 212d if the greatest signal strength identified in block 208d is less than a threshold; otherwise, the downlink Boolean flag may be cleared. A value of the threshold of block 212d may be selected to ensure that signal in the downlink direction is of a sufficiently high quality. The value of the threshold of block 212d may be based on experimentation, simulation, one or more requirements/specifications, etc.

In block 224d, a sensitivity of infrastructure (e.g., a receiver of a base station or a tower) for each cell may be identified. As part of block 224d, a communication device (e.g., a user equipment) transmission power limit (e.g., maximum) may be identified. Subject to the communication device transmission power limit, the power limit per PRB may also be identified/computed/determined as part of block 224d.

In block 228d, any gain (e.g., antenna gain) associated with the infrastructure, potentially on a per cell basis, may be identified.

In block 232d, a fixed loss (including cable loss, body/car penetration loss, and shadowing margin) for each cell may be determined/identified.

In block 236d, interference margin (e.g., noise rise) may be determined/identified for each cell.

In block 240d, a maximum path loss ($PL_{max}$) budget in the uplink direction (per PRB, per cell) may be determined/computed in accordance with blocks 224d-236d. For example, $PL_{max}$ may be computed as follows:

$$PL_{max}=(P_{tx\_max}+G)-(L_{fixed}+I_m+S_{infra}),$$

where $P_{tx\_max}$ represents the communication device transmission power limit (per PRB), G represents the combined antenna gain of the cell and the device, $L_{fixed}$ represents the fixed loss of the cell, $I_m$ represents the interference margin of the cell, and $S_{infra}$ represents the sensitivity of the infrastructure of the cell.

In block 244d, an uplink Boolean flag may be selectively set or cleared for the communication device. For example, if the value of $PL_{max}$ is greater than the actual pathloss between the cell and the device, the uplink Boolean flag may be set. Conversely, if the value of $PL_{max}$ is less than (or equal to) the actual pathloss between the cell and the device, the uplink Boolean flag may be cleared.

In block 248d, a determination may be made whether there is a hole in the coverage. For example, if the downlink flag (of block 212d) is set or the uplink flag (of block 244d) is set, that means that the network topology is incapable of providing service to the communication device in at least one of the downlink direction or the uplink direction.

Otherwise (e.g., if both the downlink flag and the uplink flag are cleared), as part of block 248d tradeoffs may be made between the downlink direction and uplink direction to select a cell to provide service for the communication device. For example, as part of block 248d it may make sense to select a cell that has the third best signal strength in the downlink direction (as determined/identified as part of block 204d) if that same cell has the best performance/coverage in the uplink direction (as determined/identified as part of block 240d). The worst-case metric as between the downlink direction and the uplink direction may serve as the limit on the coverage that is provided to the communication device.

Figure 2E:
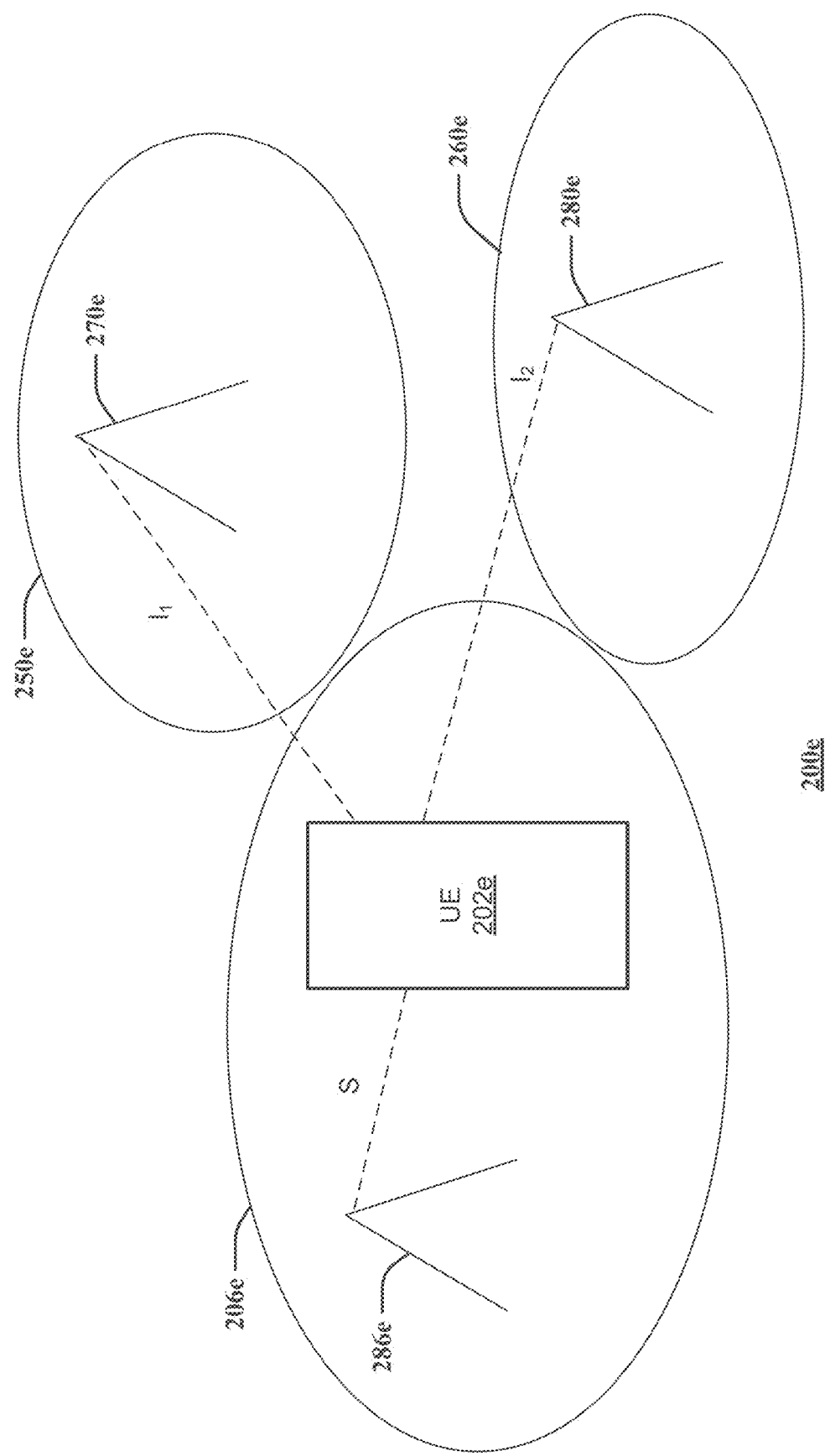
FIG. 2E is a block diagram illustrating an example, non-limiting embodiment of a system for computing one or more quality metrics in a downlink direction in accordance with aspects set forth herein.

Referring now to FIG. 2E, an example system 200e is shown that may be used to illustrate a calculation of a SINR in a downlink direction (compare with block 214c of FIG. 2C) for a communication device (illustratively, a user equipment [UE] 202e) located within a given serving cell 206e. Neighboring cells 250e and 260e (inclusive of infrastructure 270e and 280e, respectively, located therein) each may serve as a source of interference with respect to the downlink communications between (infrastructure 286e of) the serving cell 206e and the UE 202e. The SINR for the system 200e in the downlink direction may be calculated as follows:

$$SINR_{DL}=S/(I+N)=S/((\Sigma_k Q_k I_k)+N),$$

where S is the signal that the UE 202e receives from the serving cell 206e (e.g., infrastructure 286e), N is representative of background noise (frequently modeled as a random variable with a statistics-based distribution/profile), and I is representative of the collective interference generated by the neighboring cells 250e and 260e. In particular, the collective interference I from the neighboring cells 250e and 260e (where each neighboring cell 250e and 260e may be generally denoted by an index 'k') may be represented as the summation over all k ($\Sigma_k$) of the fully loaded interference ($I_k$) contributed by the $k^{th}$ neighboring cell as scaled by a loading factor ($Q_k$) for the $k^{th}$ neighboring cell representative of the PRB utilization percentage for the $k^{th}$ neighboring cell. In the exemplary embodiment of FIG. 2E, two neighboring interferers/cells 250e and 260e are shown (e.g., k=2). More generally, any number k of interferers/interfering cells may be included.

Figure 2F:
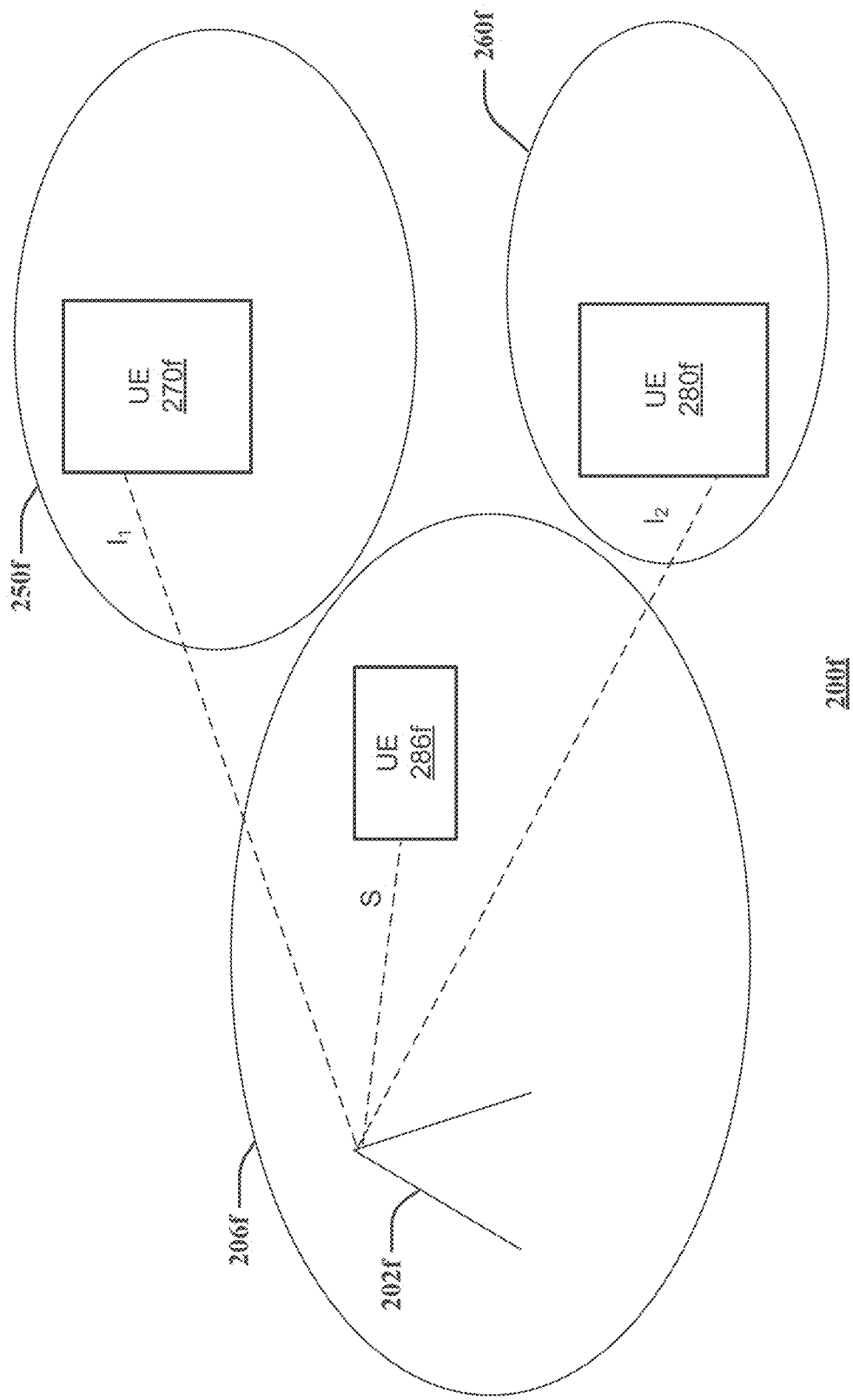
FIG. 2F is a block diagram illustrating an example, non-limiting embodiment of a system for computing one or more quality metrics in an uplink direction in accordance with aspects set forth herein.

Referring now to FIG. 2F, an example system 200f is shown that may be used to illustrate a calculation of a SINR in an uplink direction (compare with block 214c of FIG. 2C) for a communication device (illustratively, a base station [BS] 202f) located within a given serving cell 206f. Neighboring cells 250f and 260f (inclusive of UEs 270f and 280f, respectively, located therein) each may serve as a source of interference with respect to the uplink communications between UE 286f within the serving cell 206f and the BS 202f. The SINR for the system 200f in the uplink direction may be calculated as follows:

$$SINR_{UL}=S/(I+N),$$

where S is the signal that the BS 202f receives from the UE 286f, N is representative of background noise (frequently modeled as a random variable with a statistics-based distribution/profile), and I is representative of the collective interference generated by the neighboring cells 250f and 260f (illustratively represented in FIG. 2F as interference $I_1$ and $I_2$ contributed by the UEs 270f and 280f).

In terms of the calculation of the interference I in the $SINR_{UL}$ equation shown above, and as described above in connection with, e.g., the system 200a of FIG. 2A (see communication devices 206a-226a), the interference $I_1$ and $I_2$ from the neighboring cells 250f and 260f might not be constant due at least in part to the potential mobility of the UEs 270 and 280f located therein. In this respect, considerations of open-loop fractional power control and probability modeling may be taken into account when modeling the interference I as part of the $SINR_{UL}$ calculation. To this end, for the serving cell 206f (where the serving cell 206f is denoted more generally as serving cell 'n' in the description that follows), the transmit power of the UE 286f (where the UE 286f is denoted more generally as UE 'k' in the following) on each PRB may be given by:

$$P_{UE,tx}(n,k)=\min\{P_0+\alpha*L_p(n,k),P_{UE,max}\},$$

where $P_0$ and $\alpha$ are power control parameters, $L_p$ (n, k) is representative of the link loss between the $k^{th}$ UE and serving cell n, $P_{UE,max}$ is representative of the maximum transmission power allowed/enabled by the $k^{th}$ UE, and the min operator selects the minimum value of the argument contained within the brackets { }.

Thus, the received signal S at the serving cell n from the $k^{th}$ UE may be given by:

$$P_{rx}(n,k)=P_{UE,tx}(n,k)-L_p(n,k), \text{ and}$$

the interference from this $k^{th}$ UE to a neighbor cell 'm' (e.g., neighbor cells 250f and 260f of FIG. 2F) may be given by:

$$P_{rx}(m,k)=P_{UE,tx}(n,k)-L_p(m,k),$$

where $L_p$ (m, k) is representative of the link loss between the $k^{th}$ UE and cell m.

As the foregoing description demonstrates, and referring to the system 200f of FIG. 2F, the UE 286f contributes its own signal S in respect of uplink communications between the UE 286f and the BS 202f. However, that same signal S may cause interference in respect of ongoing communications in the neighboring cells 250f and 260f.

As described above, due to the potential mobility of communication devices (e.g., UEs) in the system 200f, it may be assumed that a given interfering UE being located in bin b of cell m has a probability denoted as $p_{b,m}$. Still further, it may be assumed that with respect to a full (e.g., 100%) loading factor that the actual resource (e.g., PRB) utilization in neighbor cell m will be some fraction $Q_m$ between 0% and 100%. With these assumptions in place, the (average) interference received by the serving cell n may be given as:

$$I(n) = \Sigma_{(m \neq n)} Q_m \Sigma_{(b \in Cm)} p_{b,m} P_{rx}(n,b,m),$$

where $P_{rx}(n, b, m)$ represents the received signal strength at the serving cell n when the interfering UE is located at bin b of cell m, and Cm is the set of bins b in cell m's coverage area. As shown in the above formula/equation for computing I(n), the loading factor $Q_m$ is applied over all m that is not equal (/=) to n, which is to say that a serving cell n does not experience interference with respect to itself (which otherwise would be the condition when n=m). The value of I(n) shown/computed above may be substituted for the value of I in the $SINR_{UL}$ calculation above.

In accordance with the foregoing description, each cell in a sector/face of a network may possess respective SINR profiles, one for each direction (e.g., downlink and uplink). An SINR profile may be denoted as a vector $(p_b, SINR_b)$ where b is a bin index, and $p_b$ is a probabilistic weighting factor in accordance with the bin index.

Based on simulation and/or experimentation, the SINR profiles for a given cell j may be converted/mapped into a throughput $t_{b,j}$ for a cell j. The mapping may be based at least in part on an identification of a multiple-input and multiple-output (MIMO) scheme that is used (e.g., 2×2 transmit diversity, 2×2 open-loop spatial multiplexing, etc.). In turn, and with reference to block 214c of FIG. 2C, a capacity of a cell j, denoted as $Cap_j$, may be computed/calculated as:

$$Cap_j = (B_3 - B_{over\_j})/\Sigma_{b \in CX} p_{b,x}/t_{b,x},$$

where $B_j$ is the total bandwidth of the $j^{th}$ cell, and $B_{over\_j}$ is bandwidth in the $j^{th}$ cell that is reserved for overhead (e.g., control channels/signaling). The loading factor within the $j^{th}$ cell, $Q_j$, may be calculated as:

$$Q_j = \min\{T_j/Cap_j, 100\%\},$$

where $T_j$ is representative of the forecasted traffic demand/load for the $j^{th}$ cell (compare with block 218c of FIG. 2C). As the foregoing computation demonstrates, the loading factor $Q_j$ for the $j^{th}$ cell might not be allowed to exceed 100%, as there will be insufficient resources (e.g., spectrum) available within the $j^{th}$ cell to meet the forecasted load $T_j$ if that was not the case.

Within a given sector/face, a given load balancing rule/policy may provide for/favor a distribution of a total load of the sector/face, $T_{tot}$, amongst all cells j (from j=1 to j=Ψ) in (approximately) equal amounts, potentially subject to a constraint that a portion/fraction of the total load allocated to a given cell j cannot exceed the capacity of that cell j as set forth above.

In some embodiments, a load balancing rule/policy in a given sector/face may tend to favor a distribution of the total load of the sector/face such that the loading factors $Q_j$ (e.g., the ratios of the traffic allocated to the j cells relative to the respective capacities of the j cells) across the j cells are approximately equal over the sector/face. Stated slightly differently, such a load balancing rule/policy may allocate/distribute the load of a sector/face approximately in proportion to the respective capacities of each of the cells.

Irrespective of the particular load balancing rule/policy that is in place, and from the perspective of the sector/face, the total loading factor, $Q_{tot}$, may be calculated as:

$$Q_{tot} = T_{tot}/\Sigma_j Cap_j$$

This value of the total loading factor, $Q_{tot}$, may form the basis for the value of the load described above in connection with block 222c of FIG. 2C.

Aspects of the disclosure may support an allocation of resources (e.g., frequency spectrum) in one or more networks or systems. Such networks and/or systems may support frequency division duplexed (FDD) communications. In such FDD-based embodiments, the deployed bandwidth for downlink and uplink directions may approximately be the same. Calculations for, e.g., cell capacity and loading/loading factors may be based on such an assumption.

While some of the examples set forth herein focused on an allocation, provisioning, and utilization of spectrum, aspects of this disclosure may facilitate an allocation, provisioning, and utilization of other resources, such as time. For example, networks, systems, and communication devices of this disclosure may be operative in accordance with a time division duplexing (TDD) scheme, whereby a single frequency band may be used for communications in both downlink and uplink directions. In this respect, aspects of this disclosure may allocate or assign different timeslots as between the downlink and uplink directions to avoid conflict/contention within that frequency band. Allocations of timeslots for transmitting and/or receiving information or data are facilitated by aspects of this disclosure.

While for purposes of simplicity of explanation, the respective operations, steps, and processes are shown (and described above) as a series of blocks in connection with, e.g., FIGS. 2C-2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described above, aspects of this disclosure may be used to allocate resources within a network or system. Such allocations may be geared towards ensuring a sufficiently high QoS or QoE (e.g., a QoS or QoE greater than a first threshold), while at the same time avoiding excessive or unnecessary expenditures on resources (e.g., providing for expenditures in an amount less than a second threshold). In some instances, the aforementioned first and second thresholds may converge to a single threshold, which may be representative of an optimum/best resource allocation.

In some embodiments, one or more pieces/items of information or data may be included in one or more reports that may be generated or output. As used herein, a report may include one or more graphics, images, or videos, text, audio, etc. One or more devices or mechanisms may be utilized as part of generating or outputting a report. For example, a report may be facilitated via a display screen, a speaker, a printout, etc. In some embodiments, information or data contained in a report may be perceived or acted upon by a communication device and/or a user.

As described above, aspects of the disclosure may utilize a calculation of an SINR to (ultimately) allocated/distribute traffic/load amongst cells of a sector or network. SINR is one example of a quality metric that may be utilized; in some embodiments, other forms/types of quality metrics may be used.

As described herein, aspects of this disclosure may be used to generate a prediction regarding an availability of resources within a system or a network, or a portion thereof. A determination may be made whether the predicted, available resources are adequate to meet an expected/predicted demand/load over one or more time periods, potentially relative to one or more (quality) thresholds. If the resources are inadequate, an upgrade to a capacity of the network may be provided. The upgrade may include deploying a new cell/carrier and/or increasing an amount of a resource (e.g., wireless spectrum) allocated to an existing cell/carrier.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of: system 100, systems 200a, 200b, 200e, and 200f, and methods 200c and 200d presented in FIGS. 1 and 2A-2F. For example, virtualized communication network 300 can facilitate in whole or in part obtaining a first forecast of a first load for a sector of a network, calculating a respective first signal to interference plus noise ratio for each cell of a plurality of cells included in the sector, calculating a respective second signal to interference plus noise ratio for each cell of the plurality of cells, calculating a capacity of each cell of the plurality of cells in accordance with the first signal to interference plus noise ratio of the cell and the second signal to interference plus noise ratio of the cell, and distributing the first load amongst the plurality of cells in accordance with the respective capacity of each cell of the plurality of cells. Virtualized communication network 300 can facilitate in whole or in part calculating a respective first quality metric for each cell of a plurality of cells included in a network, calculating a respective second quality metric for each cell of the plurality of cells, calculating a capacity of each cell of the plurality of cells in accordance with the first quality metric for the cell and the second quality metric for the cell, and allocating traffic of the network amongst the plurality of cells in accordance with the respective capacity of each cell of the plurality of cells. Virtualized communication network 300 can facilitate in whole or in part identifying a forecasted demand within a network over a first time period, wherein the network includes a plurality of cells, predicting an availability of resources in the network over the first time period, determining that the forecasted demand within the first time period exceeds the availability of resources in the network over the first time period relative to a threshold, and responsive to the determining, causing an upgrade of a capacity of the network, wherein the upgrade of the capacity comprises one or both of: deploying a new cell in the network, wherein the new cell is not included in the plurality of cells, and increasing a wireless spectrum allocation of a first cell of the plurality of cells.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
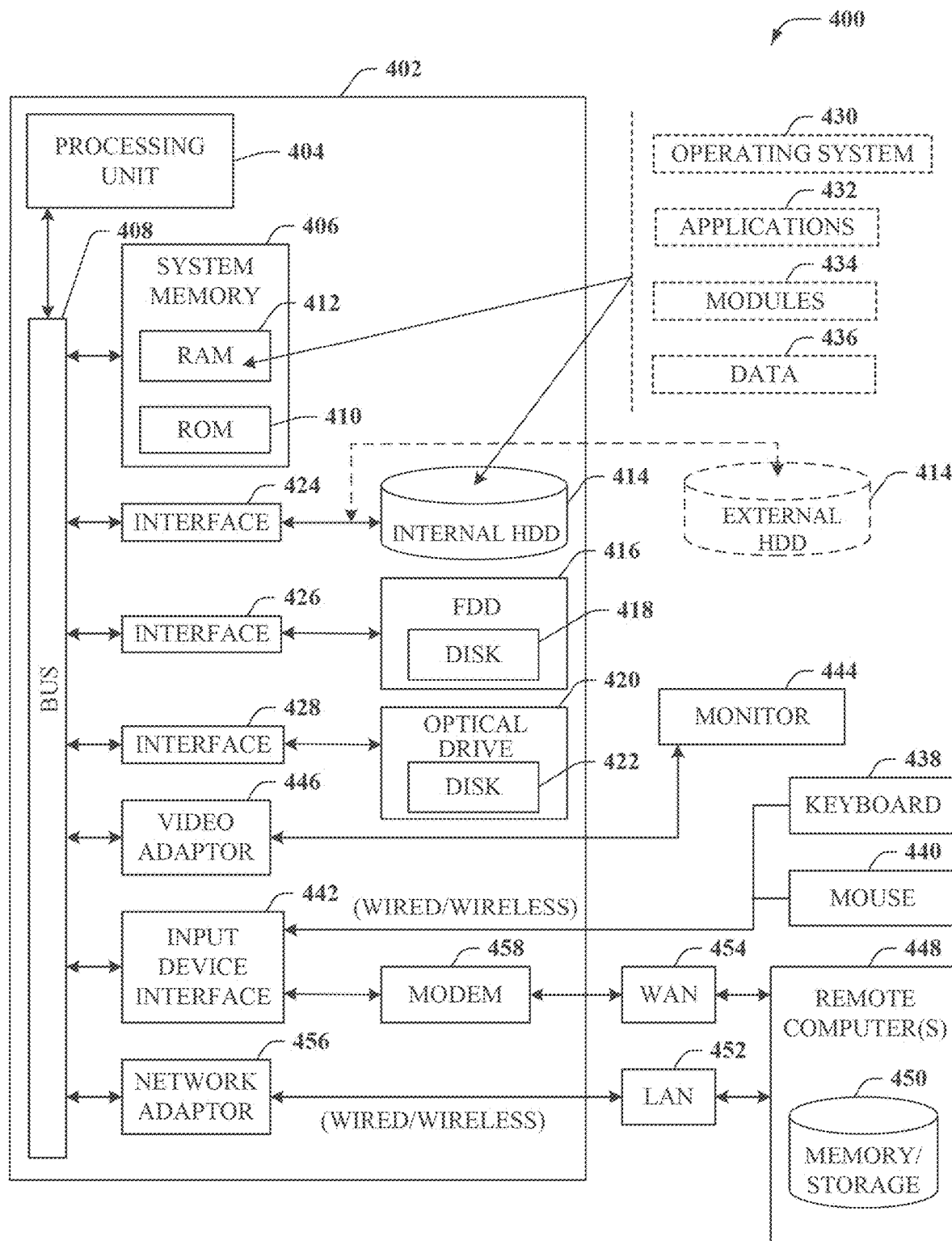
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a first forecast of a first load for a sector of a network, calculating a respective first signal to interference plus noise ratio for each cell of a plurality of cells included in the sector, calculating a respective second signal to interference plus noise ratio for each cell of the plurality of cells, calculating a capacity of each cell of the plurality of cells in accordance with the first signal to interference plus noise ratio of the cell and the second signal to interference plus noise ratio of the cell, and distributing the first load amongst the plurality of cells in accordance with the respective capacity of each cell of the plurality of cells. Computing environment 400 can facilitate in whole or in part calculating a respective first quality metric for each cell of a plurality of cells included in a network, calculating a respective second quality metric for each cell of the plurality of cells, calculating a capacity of each cell of the plurality of cells in accordance with the first quality metric for the cell and the second quality metric for the cell, and allocating traffic of the network amongst the plurality of cells in accordance with the respective capacity of each cell of the plurality of cells. Computing environment 400 can facilitate in whole or in part identifying a forecasted demand within a network over a first time period, wherein the network includes a plurality of cells, predicting an availability of resources in the network over the first time period, determining that the forecasted demand within the first time period exceeds the availability of resources in the network over the first time period relative to a threshold, and responsive to the determining, causing an upgrade of a capacity of the network, wherein the upgrade of the capacity comprises one or both of: deploying a new cell in the network, wherein the new cell is not included in the plurality of cells, and increasing a wireless spectrum allocation of a first cell of the plurality of cells.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
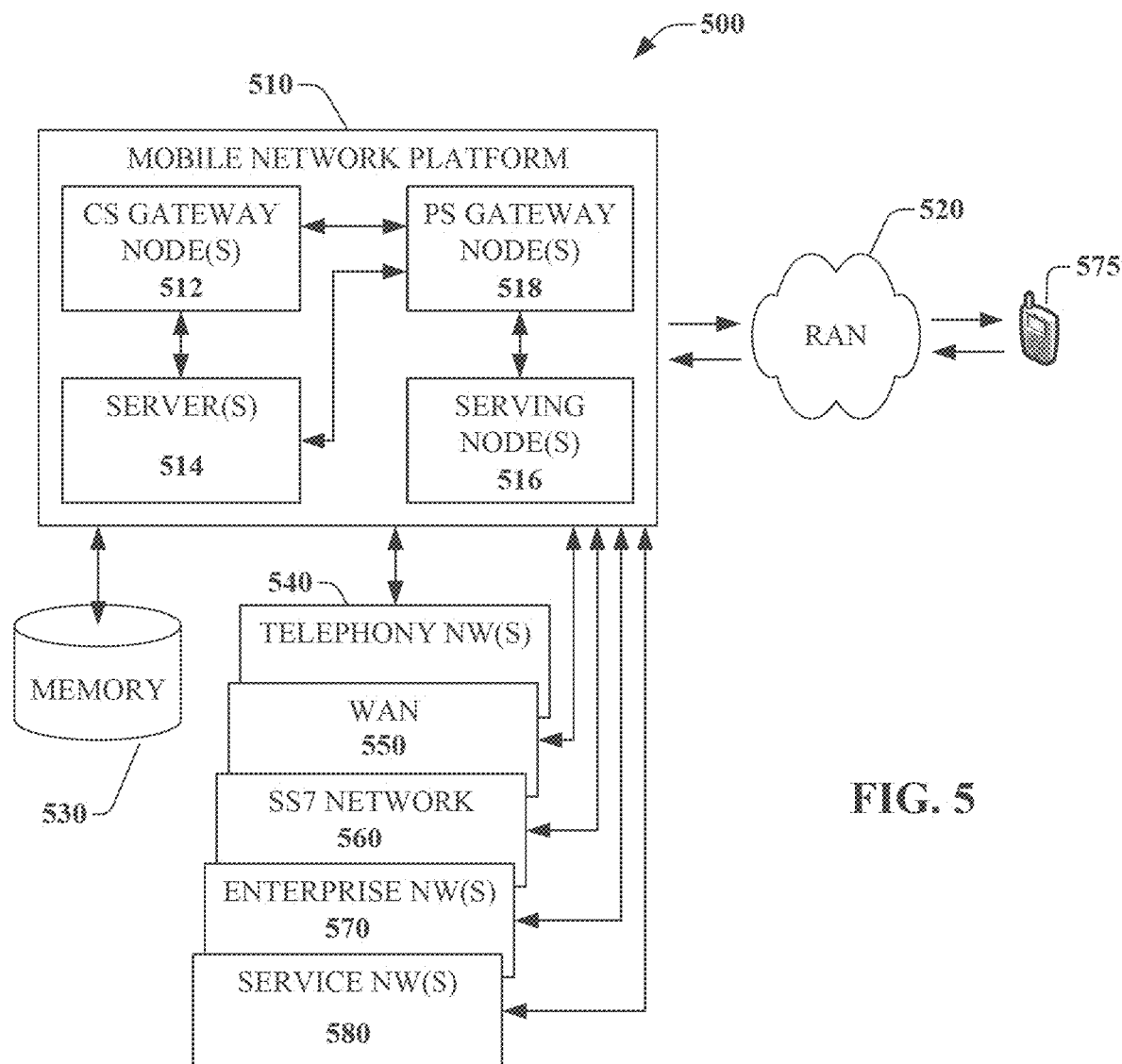
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a first forecast of a first load for a sector of a network, calculating a respective first signal to interference plus noise ratio for each cell of a plurality of cells included in the sector, calculating a respective second signal to interference plus noise ratio for each cell of the plurality of cells, calculating a capacity of each cell of the plurality of cells in accordance with the first signal to interference plus noise ratio of the cell and the second signal to interference plus noise ratio of the cell, and distributing the first load amongst the plurality of cells in accordance with the respective capacity of each cell of the plurality of cells. Platform 510 can facilitate in whole or in part calculating a respective first quality metric for each cell of a plurality of cells included in a network, calculating a respective second quality metric for each cell of the plurality of cells, calculating a capacity of each cell of the plurality of cells in accordance with the first quality metric for the cell and the second quality metric for the cell, and allocating traffic of the network amongst the plurality of cells in accordance with the respective capacity of each cell of the plurality of cells. Platform 510 can facilitate in whole or in part identifying a forecasted demand within a network over a first time period, wherein the network includes a plurality of cells, predicting an availability of resources in the network over the first time period, determining that the forecasted demand within the first time period exceeds the availability of resources in the network over the first time period relative to a threshold, and responsive to the determining, causing an upgrade of a capacity of the network, wherein the upgrade of the capacity comprises one or both of: deploying a new cell in the network, wherein the new cell is not included in the plurality of cells, and increasing a wireless spectrum allocation of a first cell of the plurality of cells.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
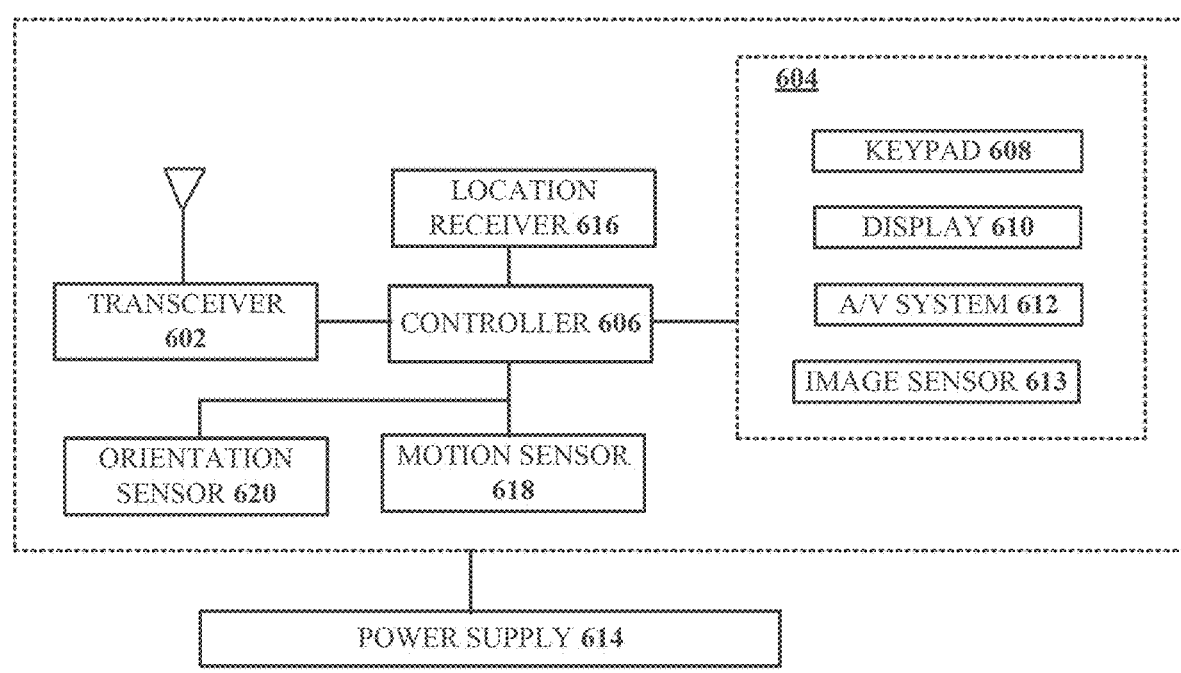
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a first forecast of a first load for a sector of a network, calculating a respective first signal to interference plus noise ratio for each cell of a plurality of cells included in the sector, calculating a respective second signal to interference plus noise ratio for each cell of the plurality of cells, calculating a capacity of each cell of the plurality of cells in accordance with the first signal to interference plus noise ratio of the cell and the second signal to interference plus noise ratio of the cell, and distributing the first load amongst the plurality of cells in accordance with the respective capacity of each cell of the plurality of cells. Computing device 600 can facilitate in whole or in part calculating a respective first quality metric for each cell of a plurality of cells included in a network, calculating a respective second quality metric for each cell of the plurality of cells, calculating a capacity of each cell of the plurality of cells in accordance with the first quality metric for the cell and the second quality metric for the cell, and allocating traffic of the network amongst the plurality of cells in accordance with the respective capacity of each cell of the plurality of cells. Computing device 600 can facilitate in whole or in part identifying a forecasted demand within a network over a first time period, wherein the network includes a plurality of cells, predicting an availability of resources in the network over the first time period, determining that the forecasted demand within the first time period exceeds the availability of resources in the network over the first time period relative to a threshold, and responsive to the determining, causing an upgrade of a capacity of the network, wherein the upgrade of the capacity comprises one or both of: deploying a new cell in the network, wherein the new cell is not included in the plurality of cells, and increasing a wireless spectrum allocation of a first cell of the plurality of cells.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   obtaining a first forecast of a first load for a sector of a network;
   calculating a respective first signal to interference plus noise ratio for each cell of a plurality of cells included in the sector;
   calculating a respective second signal to interference plus noise ratio for each cell of the plurality of cells;
   determining a capacity of each cell of the plurality of cells in accordance with the first signal to interference plus noise ratio of the cell and the second signal to interference plus noise ratio of the cell; and
   distributing the first load amongst the plurality of cells in accordance with the respective capacity of each cell of the plurality of cells.

2. The device of claim 1, wherein the respective first signal to interference plus noise ratio for each cell is associated with a downlink direction in the cell, and wherein the respective second signal to interference plus noise ratio for each cell is associated with an uplink direction in the cell.

3. The device of claim 1, wherein the operations further comprise:
mapping a signal to interference plus noise ratio profile for each cell to a respective throughput of each cell, wherein the signal to interference plus noise ratio profile includes the respective first signal to interference plus noise ratio of the cell and the respective second signal to interference plus noise ratio of the cell, wherein the determining of the capacity of each cell is in accordance with the throughput of the cell.

4. The device of claim 3, wherein the operations further comprise:
identifying a multiple-input multiple-output (MIMO) scheme that is used,
wherein the mapping is in accordance with the identifying.

5. The device of claim 1, wherein the operations further comprise:
obtaining a second forecast of a second load for the sector; and
determining that the second load is greater than a total capacity of the sector, wherein the total capacity is based on the capacity of each cell of the plurality of cells.

6. The device of claim 5, wherein the operations further comprise:
responsive to the determining that the second load is greater than the total capacity of the sector, determining that a first cell of the plurality of cells is not at a first predetermined subscription level; and
responsive to the determining that the first cell is not at the first predetermined subscription level, incrementing the first cell to a next subscription level that is less than or equal to the first predetermined subscription level.

7. The device of claim 5, wherein the operations further comprise:
responsive to the determining that the second load is greater than the total capacity of the sector, determining that a first cell of the plurality of cells is at a first predetermined subscription level; and
responsive to the determining that the first cell is at the first predetermined subscription level, deploying an additional cell in the sector, wherein the additional cell is not included in the plurality of cells.

8. The device of claim 7, wherein the deploying of the additional cell in the sector comprises deploying the additional cell with a second predetermined subscription level that is different from the first predetermined subscription level.

9. The device of claim 8, wherein the second predetermined subscription level is less than the first predetermined subscription level.

10. The device of claim 5, wherein the first forecast is associated with a first time period in a provisioning epoch and the second forecast is associated with a second time period in the provisioning epoch that is different from the first time period.

11. The device of claim 1, wherein the operations further comprise:
determining a respective first coverage in a downlink direction within each geographical region of a plurality of geographical regions within the sector; and
determining a respective second coverage in an uplink direction within each geographical region of the plurality of geographical regions.

12. The device of claim 11, wherein the operations further comprise:
identifying a hole in coverage in a first geographical region of the plurality of geographical regions when the first coverage of the first geographical region is less than a first threshold or the second coverage of the first geographical region is less than a second threshold; and
outputting a report that includes an indication of the hole.

13. The device of claim 11, wherein the determining of the respective first coverage in the downlink direction for a first geographical region of the plurality of geographical regions comprises:
obtaining a reference signal from each cell of a second plurality of cells that is included in the first geographical region, wherein the second plurality of cells is included in the plurality of cells;
calculating a respective signal strength of each reference signal to generate a plurality of signal strengths; and
identifying a maximum signal strength included in the plurality of signal strengths.

14. The device of claim 11, wherein the determining of the respective second coverage in the uplink direction for a first geographical region of the plurality of geographical regions comprises:
identifying a transmission power level associated with a communication device that is predicted to be located in the first geographical region;
identifying a gain associated with network infrastructure present in a first cell of the plurality of cells, wherein the first cell is located in the first geographical region;
identifying a sensitivity of the network infrastructure;
identifying a fixed loss associated with the first geographical region;
identifying an interference margin associated with the network infrastructure; and
computing the second coverage for the first geographical region in accordance with the transmission power level, the gain, the sensitivity, the fixed loss, and the interference margin.

15. The device of claim 1, wherein the operations further comprise:
obtaining a policy,
wherein the distributing of the first load amongst the plurality of cells is further in accordance with the policy.

16. The device of claim 15, wherein the policy specifies distributing the first load amongst the plurality of cells such that a respective portion of the first load distributed to each cell of the plurality of cells is approximately in proportion to the capacity of the cell.

17. A non-transitory machine-readable medium, comprising executable instructions that, when executed by a processing system including a processor, facilitate performance of operations, the operations comprising:
calculating a respective first quality metric for each cell of a plurality of cells included in a network;
calculating a respective second quality metric for each cell of the plurality of cells;
determining a capacity of each cell of the plurality of cells in accordance with the first quality metric for the cell and the second quality metric for the cell; and
allocating traffic of the network amongst the plurality of cells in accordance with the respective capacity of each cell of the plurality of cells.

18. The non-transitory machine-readable medium of claim 17, wherein the respective first quality metric is associated with a downlink direction, wherein the respective second quality metric is associated with an uplink direction, and wherein the operations further comprise:

obtaining a forecast of the traffic, wherein the allocating of the traffic is in accordance with the obtaining of the forecast.

19. A method comprising:

identifying, by a processing system including a processor, a forecasted demand within a network over a first time period, wherein the network includes a plurality of cells;

calculating, by the processing system, a respective first quality metric associated with a downlink direction in the network for each cell of the plurality of cells over the first time period;

calculating, by the processing system, a respective second quality metric associated with an uplink direction in the network for each cell of the plurality of cells over the first time period;

mapping, by the processing system, the respective first quality metric of each cell and the respective second quality metric of each cell to a throughput value for the cell over the first time period;

determining, by the processing system, a capacity of each cell of the plurality of cells in accordance with the throughput value of the cell over the first time period; and allocating, by the processing system, the forecasted demand over the first time period to each cell of the plurality of cells in proportion to the capacity of the cell over the first time period;

predicting, by the processing system, an availability of resources in the network over the first time period;

determining, by the processing system, that the forecasted demand within the first time period exceeds the availability of resources in the network over the first time period relative to a threshold; and responsive to the determining, causing, by the processing system, an upgrade of a capacity of the network, wherein the upgrade of the capacity comprises one or both of:

deploying a new cell in the network, wherein the new cell is not included in the plurality of cells, and increasing a wireless spectrum allocation of a first cell of the plurality of cells.

20. The method of claim 19, further comprising: identifying, by the processing system, a multiple-input multiple-output (MIMO) scheme, wherein the mapping is in accordance with the MIMO scheme.

* * * * *